April 2, 1963    J. B. BLYDENBURGH    3,083,464
SURVEYOR'S TRANSIT THEODOLITE CHAINING ATTACHMENT
Filed Feb. 12, 1960    2 Sheets-Sheet 1

April 2, 1963 J. B. BLYDENBURGH 3,083,464
SURVEYOR'S TRANSIT THEODOLITE CHAINING ATTACHMENT
Filed Feb. 12, 1960 2 Sheets-Sheet 2
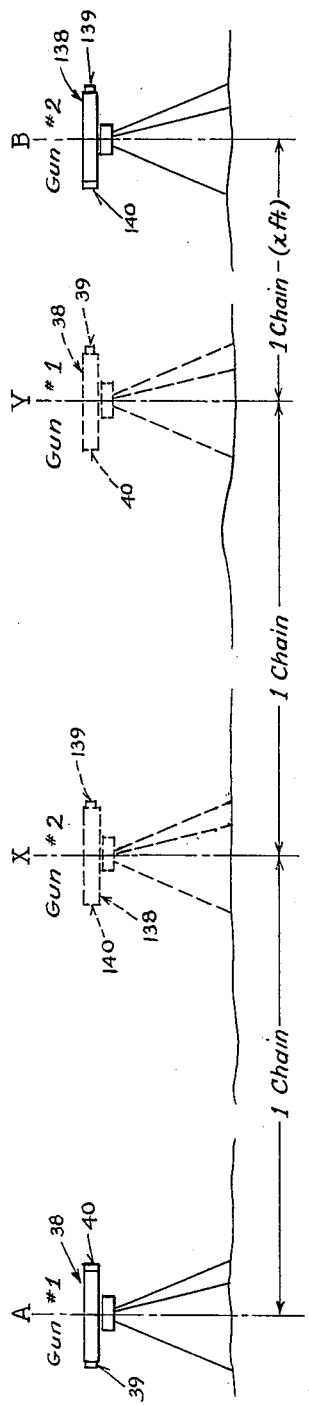
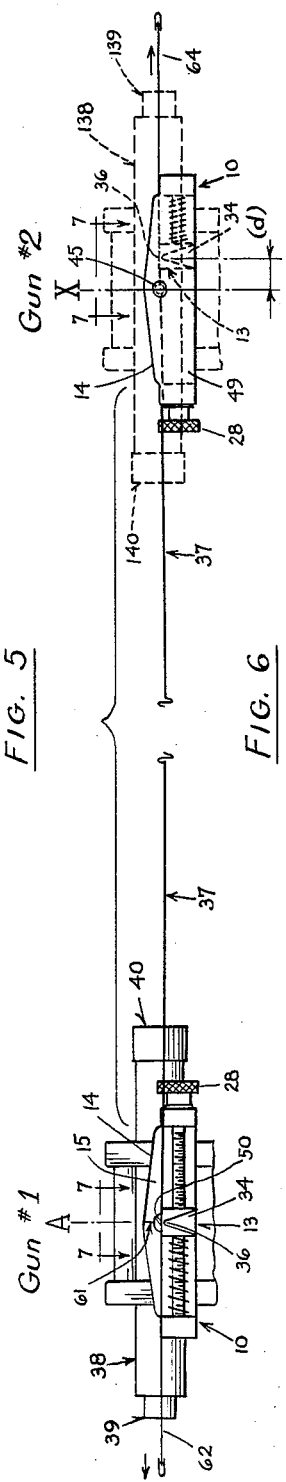
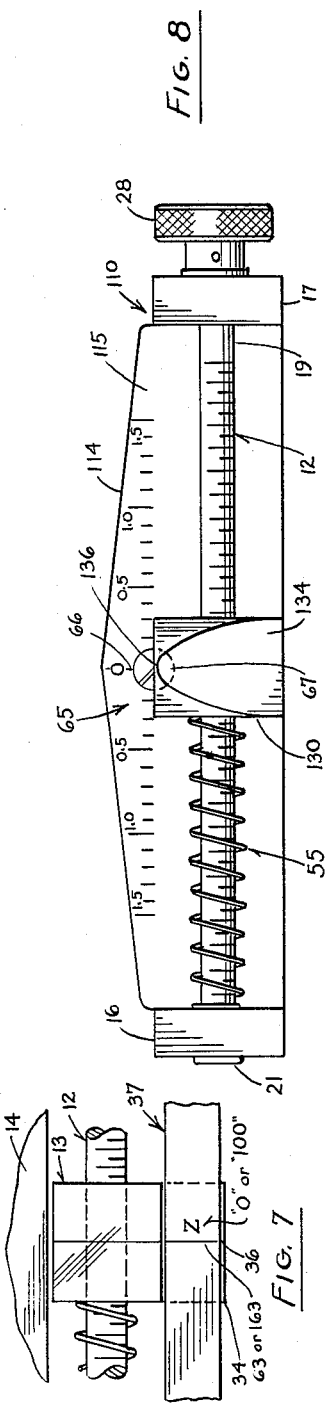

United States Patent Office 3,083,464
Patented Apr. 2, 1963

3,083,464
SURVEYOR'S TRANSIT THEODOLITE CHAINING ATTACHMENT
John B. Blydenburgh, 727 Fort Salonga Road, Northport, N.Y.
Filed Feb. 12, 1960, Ser. No. 8,422
6 Claims. (Cl. 33—1)

The present invention relates to surveyor's transit theodolites (hereinafter called "transit" or "gun" in accordance with conventional surveying practice) and means thereof to facilitate chaining a line or the distance between two remote stations.

A general object of the present invention is to provide an attachment for a transit which is simple in construction and readily mounted thereto and provides a ready means for compensating for differences between successive transit set-ups between stations a plurality of chains apart and the actual distances between these set-up points, and which facilitates in an efficient and simple manner other chain measurements effected with the use of a transit equipped therewith.

A more specific object of the invention is to provide such an attachment characterized by screw adjustable means for supporting a chaining tape along the optical axis of the transit telescope at points offset along this axis from the axis of the telescope axle or shaft for ready cumulative or direct determination of such offset distances.

A further object of the invention is to provide structural embodiments of the device which are readily constructed and allow efficient use and operation thereof.

Other objects of the invention will in part be obvious and will in part appear hereinafter.

The invention accordingly comprises the features of construction, combinations of elements, and arrangements of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 5 is a side elevational diagrammatic view of a pair of transits equipped with such attachments not depicted therein, illustrating use thereof in the chaining of a line between remote stations A and B a plurality of chains apart;

FIG. 6 is a side elevational view, with parts broken away and others indicated in dotted lines, of the pair transits illustrated in FIG. 5, depicting use thereof in the chaining of the distance from station A to the first set-up point there succeeding;

FIG. 7 is an enlarged plan view, with parts broken away, of either of the two chaining attachments shown in FIG. 6, illustrating correct association of a portion of the chain with either as it may be viewed from either of the two lines 7—7 therein; and FIG. 8 is an enlarged side elevational view of a modified form of the attachment of the present invention.

Figure 1:
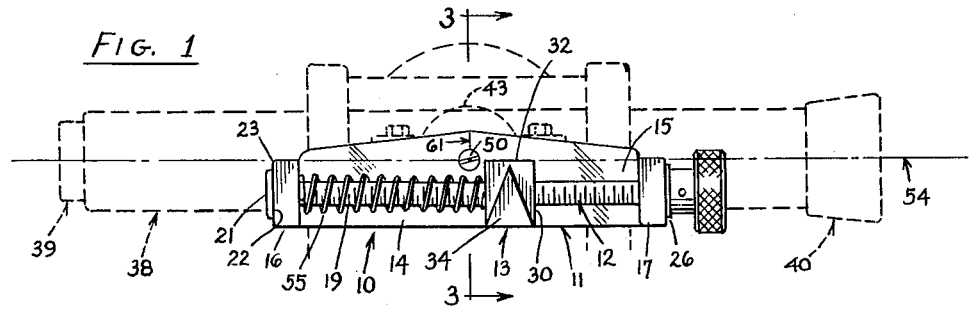
FIG. 1 is a side elevational view to approximate scale of an embodiment of the attachment of the present invention, showing in dotted lines portions of a transit to which it is mounted for use.

Referring to the drawings, in which like numerals identify similar parts throughout, it will be seen from FIGS. 1 to 4 incl. that an embodiment of the present invention, indicated at 10, may comprise an elongated frame means 11, translating screw means 12 and a traveler 13. The frame means 11 preferably includes an elongated frame plate 14 having a longitudinally-extending flat side or vertical face 15 and provided at its opposite ends with a pair of support arms 16 and 17 extending angularly therefrom in longitudinally-spaced relation. Preferably the support arms 16 and 17 extend laterally outward from the side face 15 and substantially normal thereto, and may be formed as integral end portions of the frame plate.

Figure 4:
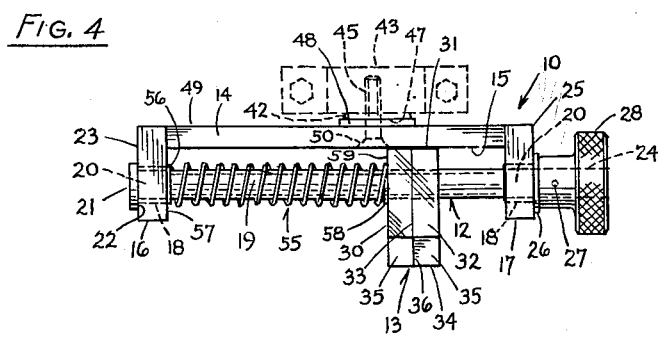
FIG. 4 is a top plan view of the attachment structure shown in FIGS. 1 and 3, depicting in dotted lines parts of the transit telescope axle and one of the standards through which the latter is journaled.

The translating screw means 12 is rotatably supported by the support arms 16 and 17 and, for this purpose, each support arm may have a through bore fitted with a sleeve bearing 18 to provide a longitudinally-spaced pair thereof, as is indicated in FIG. 4. The screw means 12 preferably may be in the form of a shaft 19 having longitudinally-spaced journal sections 20, 20 rotatably received through the bearings 18, 18, and an externally-threaded section intervening these bearings and the support arms 16 and 17 in which the latter are mounted. The threads of the threaded section of screw shaft 19 may have a pitch of the order of thirty-two threads per inch (32 th./in.), or any other pitch which one may prefer. Preferably one end 21 of the screw shaft is headed to provide an annular shoulder 22 rotatably abutted to end face 23 of support arm 16. The other end 24 of screw shaft 19 projects appreciably beyond the end face 25 of support arm 17 and may be surrounded adjacent the latter with a thrust washer 26. Upon the shaft end 24 is fixed, such as by a drift pin 27, a knurled hand knob 28 for manual manipulation or rotation of screw shaft 19. Thus, in the rotation of screw shaft 19 by the manual knob 28, longitudinal movement thereof is prevented by the headed end 21 and the thrust washer 26 and the knob.

The traveler 13 has thread following means engaged with the external threads of screw shaft 19 for translation longitudinally of the frame means 11 and, for this purpose, may be provided with an internally-threaded through hole 29 through which is threadably engaged the threaded section of the screw shaft 19. Means are provided to permit the traveler 13 to slide along the frame plate 15 while preventing relative rotation, so as to cause the traveler to be translated along the threaded section of the screw shaft 19 when the latter is rotated. For this purpose the traveler 13 may be in the form of a block 30 having an inner vertical side face 31 juxtaposed closely to or in sliding contact with the frame plate outside face 15. The traveler block 30 also preferably has a flat top face 32 provided with a transverse index mark 33 which, if desired, may be in the form of a fine groove.

Figure 2:
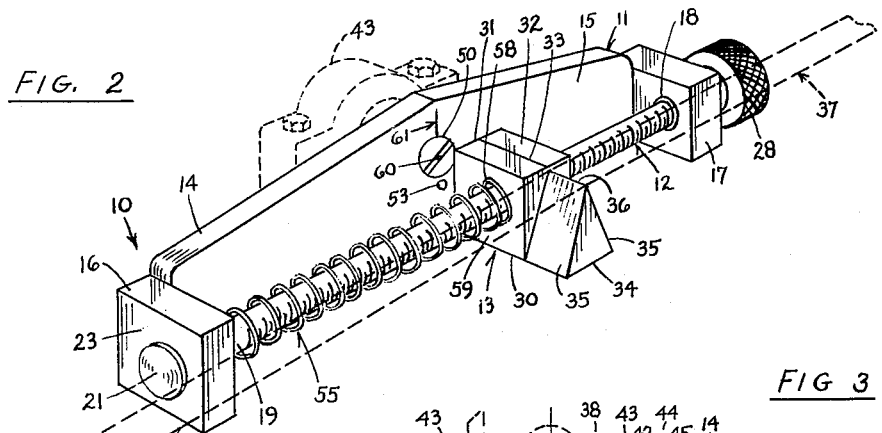
FIG. 2 is an enlarged perspective view of the attachment shown in FIG. 1, depicting in dotted lines parts of the transit and of a chain tape associated with the attachment.

Chain pillow means 34, to serve as a chain rest or cradle, is carried by the traveler block 30 and may, if desired, be made integral therewith to simplify manufacture. The chain pillow means 34 in the FIGS. 1 to 4 incl. embodiment is in the form of an upwardly tapered body having oppositely sloped, oblique side faces 35, 35 meeting in a lateral, transversely-extending apex edge 36. A chain, such as the conventional flat tape type indicated in dotted lines at 37 in FIG. 2, is to be rested upon the pillow apex 36 for drag thereover. Since the top face 32 in the structural embodiment illustrated in FIGS. 1 to 4 incl. is to be aligned with the axis of the telescope axle to which this accessory or attachment is to be fixedly mounted, the apex 36 of the chain pillow 34 is located substantially at the plane thereof, but preferably is offset or disposed below this top face a distance $t$, indicated in FIG. 3, which is the average thickness of such conventional chain tapes, thereby permitting the top face of the tape at the pillow apex to be substantially aligned with the traveler block top face and index mark 33 on the latter.

Figure 3:
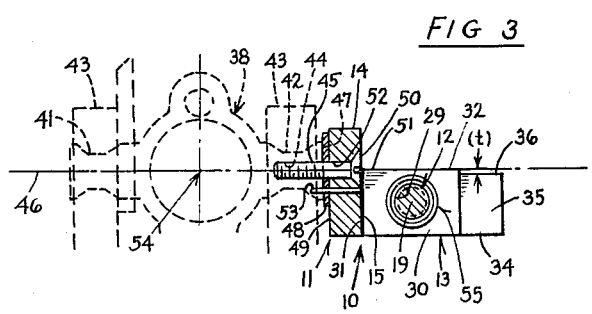
FIG. 3 is a sectional view taken substantially on line 3—3 of FIG. 1.

The accessory or attachment 10 of the present invention is to be fixedly mounted to one end of the conventional telescope axle of a transit. The telescope of such a transit is indicated in dotted lines at 38 in FIGS. 1 and 3 which, as is suggested in FIG. 1 will include the usual back end eyepiece 39 and the front end 40. The telescope axle may, in conventional manner, be in the form of a pair of stub shafts 41 and 42, each rotatably supported by a conventional standard structure 43, as is indicated in dotted lines in FIG. 3. Since the accessory 10 is to be fixedly mounted upon the telescope axle, the stub shaft 42 may, for this purpose, be provided with an internally-threaded hole 44 adapted threadably to receive the externally-threaded shank of a screw 45 which will have its axis substantially aligned with the axle axis 46. The outer end 47 of stub shaft 42 may be in the form of a flat face against which is abutted a washer 48 arranged about the shank of screw 45 and in turn against which the inside vertical face 49 of frame plate 14 is abutted. Screw 45 has an enlarged head 50 which is seated in a counter-sunk recess 51 in the outside face 15 of vertical frame plate 14 with the screw shank extending through a hole 52 in this plate. By such means the accessory frame means 11 is securely mounted to the outer end 47 of the axle stub shaft 42. This mount of the accessory 10 is to be of a fixed nature so that the accessory will rotate with the telescope axle. This fixed relationship may be attained by the employment of a drift pin 53 extended through aligned holes in the frame plate 14, the thrust washer 48 and into the outer end of axle stub shaft 42, as is indicated in FIG. 3. Any desired equivalent means may be employed fixedly to mount such frame means to an end of telescope shaft structure in practice of the invention, either by the transit manufacturer or by one who possesses a conventional transit to which he may wish to add such accessory.

This fixed mount of the accessory 10 to one end of the telescope axle is to be such that the index mark 33 on the top face 32 of the traveler block 30 will be aligned with the telescope axle axis 46 in the "0" position of the traveler block, as may be understood from FIG. 3. Also, when the accessory 10 is fixedly mounted in this manner, or by any other suitable means, to the end of the telescope axle it is also intended that when the traveler block 30 is translated longitudinally of the frame means 11, i.e., along the vertical outside face 15 of the frame plate 14, the top face 32 of the traveler block is to move along in parallel relation to the optical axis of the telescope, indicated at 54 in FIGS. 1 and 3. Thus, the pillow apex 36 which is offset laterally to one side of the telescope optical axis 54 will be translated along a path substantially parallel to this telescope axis in a plane which is located at the small distance $t$ below a plane having as line elements the intersecting telescope axle axis 46 and the telescope optical axis 54.

In order to eliminate backlash between the threads of the threaded section of screw shaft 19 and the internal threads of the hole 29 through the traveler block 30, spring means may be interposed between the traveler block and one of the support arms 16 and 17, and, if desired, such spring means may be located on opposite sides of the traveler block but one such biasing spring device will serve the purpose. Such spring means may be in the form of a helical compression spring 55 having one end 56 abutted against the inner face 57 of support arm 16 and its other end 58 abutted against the opposite face 59 of the traveler block 30, with the turns thereof arranged about screw shaft 19.

In order to facilitate adjustment of the traveler block 30 to the "0" position with its index mark 33 aligned with the telescope axle axis 46, the head 50 of screw 45 may, if desired, be provided with an axial drill hole or dimple 60, as is best seen in FIG. 2. Also, this alignment may be facilitated by the provision of a vertical mark or line 61 on the face 15 of frame plate 14 aligned with such drill hole 60.

So that one may appreciate readily some of the advantages attainable by use of the accessory or attachment 10 of the present invention, let it be assumed that it has been fixedly mounted to one end of the telescope axle of a transit in a suitable manner, such as is proposed in FIG. 3, and that two such transits have been so equipped with such device. In FIG. 5 is diagrammatically illustrated the measuring of a line with the use of these two transits there identified as "Gun #1" and "Gun #2." The distance between remote station A and station B is to be measured and this distance, for example, may be two plus (2+) chains. Thus, instead of transferring the positions of the ends of the chain tape to the ground by means of plumb bobs or to previously placed stakes by actual contact, the positions of set-ups are transferred directly to the accessories or attachments with which the two transits have been equipped. Advantageously the transits, while being of conventional construction, should be mounted on low tripods so that the horizontal axles thereof will be at convenient working heights, such as about waist-high or slightly lower. Preferably, each accessory or attachment 10 is mounted to the right side of the telescope of each transit and the note keeping and subsequent calculations are simplified if the dimensions of the horizontal axles of the two transits are the same. The adjustment of the vertical circle of each transit is important. Also, in the method of measurement practiced with such accessory-equipped transits, the chain tape, which may be of conventional length, e.g., one hundred feet (100'), two hundred feet (200') or fifty meters (50 m.), is supported only at each end, and thus the control of the tension applied thereto as it is stretched from the accessory on one transit to the accessory on the other transit is important. Measurements requiring an extreme degree of accuracy dictate consideration of the change in the straight line distance between the reference marks on the end sections of the chain tape, such as "0" and "100," as the vertical angle changes from the horizontal.

In measuring the line from the station A to the station B, one transit (Gun #1) is carefully set up over the starting point at station A and the telescope 38 thereof is sighted on station B. The chain tape is then stretched toward station B and a point is set on the line at the first chain length in the vicinity of temporary intervening station X. In setting this point, the chain tape should be held at a convenient working height and since this is only a temporary point, it will be sufficiently accurate if it is set within about four hundredths of a foot (0.04') of the true chain length. The second transit (Gun #2) is now set up solidly over the temporary point at temporary intervening station X, leveled up and sighted back upon the intersection of the telescope 38 and its horizontal axle of transit (Gun #1) at station A, making certain that all clamps are secure. This back sighting of the second transit (Gun #2) at X is indicated in FIG. 5 by the orientation of the dotted line showing thereat of telescope 138, its front end 140 and its eyepiece 139. The vertical angle and the temperature at the second transit (Gun #2) are now observed and recorded. The telescope 38 of the transit (Gun #1) at station A is now sighted on the intersection of the telescope 138 and its horizontal axle of the transit (Gun #2) at temporary intermediate station X. After making certain that all clamps of transit (Gun #1) are secure, the vertical angle and temperature at station A are also observed and recorded. As a result, the set up depicted in FIG. 6 is attained.

With the telescope 38 of the first transit (Gun #1) at station A sighting forward and the telescope 138 of the second transit (Gun #2) at intervening temporary station X sighted back, it will be seen from FIG. 6 that the accessory or attachment 10 mounted on the first transit at station A is on the near side as viewed in FIG. 6, but that this accessory or attachment mounted on the second transit at station X is on the far side of telescope 138. Thus, the telescope 138 has been shown in dotted lines in FIG. 6 in order more clearly to see the accessory or attachment 10 associated therewith, the back face 49 of the frame plate 14 thereof being nearest the observer. The chain tape 37 is now brought into position for accurate measurement of the distance between the stations A and X. It may be desirable to stretch the chain tape 37 from station A to station X on the same side of the two transits (Gun #1 and Gun #2) by locating the "0" reference mark at the rear end of the tape opposite the usual drill hole on the center of the end of the left side axle stub shaft of the transit at station A and slidably resting the front end of the tape on the pillow apex of the attachment 10 mounted on the transit at station X and pulling the tape to the desired tautness thereover. However, since it is proper to cross the tape over from one side of the line to the other in effecting such a measurement, the compensating calculation to accommodate this angular relationship being readily made, such stretching of the tape is illustrated in FIG. 6 for clarity of illustration and ready understanding.

As is indicated in FIG. 6, the rear end 62 of the chain tape 37 will be rested over the apex 36 of the pillow 34 of the attachment 10 at station A and held firmly with its reference mark "0," indicated at 63 in FIG. 7, aligned with pillow apex 36 and the mark 61 on the face 15 of frame plate 14. The tape front end 64 will be rested upon the pillow apex 36 of the other accessory or attachment 10 mounted on the transit at station X and pulled forward thereover to suitable tautness. The instrument man operating the transit at station X will then reach forward along the side of the telescope 138 and manipulate the manual knob 28 to translate the traveler block 13 of the accessory 10 on the second transit (Gun #2) until the pillow apex 36 is brought to alignment with the reference mark on the forward end 64 of the tape, as is also indicated at 163 in FIG. 7. In FIG. 7 both of the reference marks "0" and "100" on opposite ends of the tape 37 are depicted by the common character "Z." It will be noted from FIG. 6 that actually the second transit (Gun #2) was set up over a point short of a complete chain length the short distance d. While this chaining is being accomplished the temperature of the air at the middle of the chain tape 37 can be observed by swinging a thermometer there at the height of the tape. With the second transit (Gun #2) remaining in its set up position at temporary intervening station X, the next step in the measurement of the distance between stations A and B is then performed in the following manner.

The first transit (Gun #1) at station A is then moved forward beyond the second transit at temporary intervening station X to approximately a chain length therefrom at temporary intervening station Y and set up in the manner described with respect to the second transit at station X. The first transit (Gun #1) at temporary intervening station Y is then sighted back upon the second transit (Gun #2), which remained without change at temporary intervening station X, in the same manner as was the sighting of the latter upon the first transit when set up at station A. With all clamps secure, the vertical angle and temperature at the transit (Gun #1) at temporary intervening station Y are observed and recorded. Now the distance is chained between the temporary intervening stations X and Y by using in the previously described manner the accessories or attachments 10, 10 of the two transits. In this procedure, since the telescopes 38 and 138 of both of the transits (Gun #1 and Gun #2) are sighting back along the line in the same direction, the accessories or attachments 10, 10 will be on the same far sides of the transit telescopes, as viewed in FIG. 5. Thus, the measurement with the chain tape will be effected along the same side of the line without cross over and no compensating calculation is required, it being remembered that the transit at station X was changed in no way after the first chaining measurement. This second chain length measurement will thus be made from a point exactly one full chain length forward of station A since the pillow apex 36 at station X had been moved forward the distance d and will now be used for alignment therewith of the "0" on the back end portion 62 of the tape 37 as the latter is pulled forward to temporary intervening station Y. Let it be assumed that temporary intervening stations X and Y are a distance apart slightly greater than one full chain length, thus plus distance being d'. The knob 28 of the accessory or attachment 10 on the first transit (Gun #1) which is now set up at temporary intervening station Y will be manipulated to back up its traveler block 30 until the pillow apex 36 carried thereby is aligned with the forward reference mark "100" on the front end portion 64 of the tape. Thus, while the transit at temporary intervening station Y (Gun #1) has been located forward from station A a distance equal to the sum of one chain length minus the distance d, and another full chain length plus the distance d', these variations need not be taken into consideration in the taking of notes since the pillow apex 36 on the transit (Gun #1) at temporary intervening station Y has been adjusted to be exactly two chain lengths forward of station A by this chaining procedure. The next and final steps of measuring the line between stations A and B is then performed as follows.

When the pillow apex 36 of the accessory or attachment 10 on the transit (Gun #1) at temporary intervening station Y has now been adjusted to be exactly two chain lengths forward from station A, the clamps of the transit (Gun #2), which is now the rear one at station X, can be released and its telescope 138 then sighted forward with its cross hairs aligned on the intersection of the telescope and horizontal axle of the transit (Gun #1) at temporary intervening station Y. The vertical angle of and temperature at transit (Gun #2) at station X are then observed and recorded. Now transit (Gun #2) is picked up and moved forward to station B which is assumed to be (x ft.) less than one full chain length forward of temporary intervening station Y. With set up of the transit (Gun #2) at station B and exact alignment of its plumb bob over the station B point, the traveler block 30 of the accessory or attachment 10 mounted on this transit (Gun #2) can then be adjusted by manipulation of the manual knob 28 to bring the pillow apex 36 back to exact alignment with the axle axis of telescope 138. With telescope 138 sighted back on the intersection of telescope 38 and the axle of the transit (Gun #1) at temporary intervening station Y, the chain tape 37 will then be pulled over the chain pillows 34, 34 of the two attachments, and with the reference mark "0" on the back end 62 of the chain tape aligned with the pillow apex 36 of the adjusted traveler block 30 on the transit (Gun #1) at station Y the exact measurement between it and the pillow apex 36 aligned precisely over station B point will be directly read from the tape. This will give the exact distance between stations A and B as two full chains, plus one chain minus (x ft.).

It will thus be seen that no precise measuring of the exact distances between station A and temporary intervening station X, and between the latter and temporary intervening station Y, was necessary to the determination of the exact distance between the stations A and B. The manipulations of the accessories or attachments 10, 10 mounted on the two transits (Gun #1 and Gun #2) automatically accommodated the differences between exact chain lengths and the true distances between the starting point and the temporary intervening stations without requiring any book recording of any measured intervening distances. If it is required to get the plus distance to a point along the line during such chaining procedure, this can be accomplished easily by measuring the distance to the point from the index mark provided on the attachment by the pillow apex. This measured distance is the hypotenuse of a right triangle with one leg thereof being the distance at the apex index mark from the center line of the telescope and with the other leg thereof being the required plus distance which can be obtained by computation.

The device of the present invention when mounted upon a transit and used in the manner proposed permits practice of a simple and direct way of measuring a line and at the same time retaining a very high degree of accuracy. With the use of a pair of transits so equipped and the line measured in the manner indicated on the incline, due to differences in elevations of the set up points, the vertical angle is measured at each end of the chain tape length thus affording a check on the angle. The horizontal component of the tape length is the inclined distance multiplied by the cosine of the mean of the two vertical angles. If the vertical component is needed it is the chain tape length multiplied by the sine of the mean of the two vertical angles. All measurements are taken at a convenient working height which is an important factor in performing field work. The only critical requirement of transits equipped with devices of the present invention is that the vertical circle and the bubble of each must be in precise adjustment.

Advantageous use of the accessory or attachment of the present invention may be enhanced by a modified form thereof, such as that illustrated in FIG. 8. As therein proposed, the accessory or attachment 110 may be like that illustrated in FIGS. 1 to 4 incl. except that the frame plate 114 may have its outside vertical face 115 provided with a measuring scale 65 having an "0" mark 66 at the position of the "0" mark 61 of the other embodiment, and with the pillow body 134 of the traveler block 130 modified in shape so that the apex 136 is at the high part of a rounded nose 67. The latter feature avoids the tendency of a chain tape to be sharply bent at the pillow apex which may exist when the latter is the sharp edge of a wedge-shaped body, such as 34 of the FIGS. 1 to 4 incl. embodiment.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A chaining attachment or accessory mounted on a surveyor's transit having a conventional telescope pivotally supported on a transverse axle comprising, in combination with said transit, of elongated frame means, means fixedly mounting said frame means upon the axle of the telescope of said transit with said frame means extending longitudinally in the direction of the optical axis of the telescope, elongated translating screw means rotatably supported by said frame means with arrangement of the axis of said screw means substantially parallel to the telescope optical axis, means manually to rotate said screw means, a traveler having thread following means engaged by said screw means for translation longitudinally of said frame means along a path substantially parallel to the telescope axis, and chain pillow means carried by said traveler having an apex transversely aligned with the telescope axle axis and the telescope optical axis for travel along the latter in substantially parallel relation thereto when said screw means is rotated, the apex of said pillow means being alignable with a reference mark on a chain slidably rested thereon and held against longitudinal movement.

2. A chaining attachment or accessory mounted on a surveyor's transit having a conventional telescope pivotally supported on a transverse axle comprising, in combination with said transit; of an elongated frame plate having a pair of support arms extending angularly therefrom and spaced longitudinally thereof, means fixedly mounting said frame plate to an end of the axle of the telescope of said transit with said plate extending longitudinally along one side of the optical axis of the telescope, an elongated translating screw supported by said arms for free rotation without longitudinal translation relative thereto, the axis of said screw being parallel to and to one side of the telescope optical axis with said frame plate mounted fixedly to the end of the telescope axle, hand grasp means carried by said screw for manual rotation thereof, a traveler block having screw thread following means engaged with said screw, means to permit said block to slide along said frame plate while preventing relative rotation for causing said block to be translated along said screw parallel to the telescope optical axis upon manual rotation of said screw, and an upwardly-tapered chain pillow carried by said block having a transversely-extending lateral apex over which a chain is to be stretched to alignment therewith of a reference mark on the chain, said pillow apex being located substantially in a lateral plane which includes as line elements the telescope axle axis and the telescope optical axis for longitudinal translation along the latter upon manual manipulation of said screw.

3. The chaining attachment as defined in claim 2 characterized by said frame plate having a longitudinally-extending flat face, said frame plate mounting means being of a construction to fix said plate to the end of the telescope axle with said flat face arranged in a vertical plane, said screw being rotatably mounted laterally to the side of said flat face for translation along the latter of said pillow apex, and an elongated measurement scale carried by said flat face and oriented to be arranged substantially parallel to the telescope optical axis with the pillow apex being translatable along said scale for direct reading of the distance of adjustment of the pillow apex along the telescope optical axis by screw manipulation.

4. A chaining attachment or accessory mounted on a surveyor's transit having a conventional telescope pivotally supported on a transverse axle comprising, in combination with said transit; of an elongated flat frame plate having a longitudinally-extending, vertical outside face; a pair of longitudinally-spaced, substantially parallel arms mounted on said frame plate and extending laterally outward from the vertical face thereof; attaching means fixedly mounting said frame plate to one end of the axle of said transit telescope with the outside face thereof arranged substantially normal to the axle axis and extending longitudinally along one side and laterally of the optical axis of the telescope; a pair of aligned bearings with each supported by one of said arms; an elongated translating screw having a pair of axially-spaced journals rotatably supported by said pair of bearings and a threaded section intervening said journals, said screw being located parallel to the telescope optical axis and laterally to one side thereof with said frame plate mounted fixedly to the end of the telescope axle; a hand knob mounted on said screw for manual rotation thereof; a traveler block threadably engaged with the threaded section of said screw and having a side face juxtaposed to the vertical face of said frame plate for slide therealong parallel to the telescope optical axis upon manual rotation of said screw while preventing rotation of said traveler block; spring means interposed between said traveler block and one of said arms preventing backlash between said block and the screw threaded section; and an upwardly-tapered chain pillow carried by said block having a transversely-extending lateral apex over which a chain tape is to be stretched to alignment therewith of a reference mark on the chain, said pillow apex being arranged as a line element in a lateral plane parallel to and spaced the average thickness of conventionl chain tapes below a lateral plane which includes as line elements the telescope axle axis and the telescope optical axis for longitudinal translation along the telescope optical axis upon manual rotation of said screw.

5. The chaining attachment or accessory as defined in claim 4 characterized by an elongated measurement scale carried by said frame plate vertical face and oriented substantially parallel to the telescope optical axis with the pillow apex being translatable along said scale for direct reading of the distance of adjustment of the pillow apex along the telescope optical axis by screw rotation.

6. A chaining attachment or accessory mounted on a surveyor's transit having a conventional telescope pivotally supported on a transverse axle comprising, in combination with said transit, of elongated frame means, means fixedly mounting said frame means upon the axle of the telescope of said transit with said frame means extending longitudinally in the direction of the optical axis of the telescope, elongated translating means supported by said frame means with arrangement of the axis of said translating means substantially parallel to the telescope optical axis and normal to the axis of said axle, a traveler mounted on said translating means for travel therealong longitudinally of said frame means along a path substantially parallel to the telescope axis, means to adjust the position of said traveler along said translating means, means temporarily to fix said traveler in a selected one of a plurality of adjusted positions along said translating means with fine adjustment of the forward position of said traveler relative to a chaining point over which said transit is set up, and chain pillow means fixedly carried by said traveler having an apex transversely aligned with the telescope optical axis for travel along the latter in substantially parallel relation thereto when said traveler is adjusted along said translating means, the apex of said pillow means providing a reference point for alignment therewith of a reference mark on a chain slidably rested thereon and pulled tautly thereover while being held against longitudinal movement with respect to another remote chaining point.

References Cited in the file of this patent
UNITED STATES PATENTS

| | | |
|---|---|---|
| 380,740 | Balsbaugh | Apr. 10, 1888 |
| 437,308 | Markham | Sept. 30, 1890 |
| 2,706,336 | Gruber | Apr. 19, 1955 |

OTHER REFERENCES

Tracy: Surveying Theory and Practice, New York, John Wiley & Sons, Inc., Fifth Printing, 1955, Fig. 716(b), page 856 relied on.